United States Patent
Lagana

Patent Number: 5,985,224
Date of Patent: Nov. 16, 1999

[54] PROCESS FOR AMMONIA PRODUCTION THROUGH UREA HYDROLYSIS

[75] Inventor: Vincenzo Lagana, Milan, Italy

[73] Assignee: Siirtec-Nigi S.p.A., Milan, Italy

[21] Appl. No.: 09/160,429

[22] Filed: Sep. 24, 1998

[30] Foreign Application Priority Data

May 25, 1998 [IT] Italy ................................ MI98A1155

[51] Int. Cl.⁶ .............................. C01C 1/08; C01B 21/00
[52] U.S. Cl. .......................................... 423/235; 423/358
[58] Field of Search .................................. 423/220, 235, 423/237, 358

[56] References Cited

U.S. PATENT DOCUMENTS 4,087,513  5/1978  Schell ........................................ 423/437
5,240,688  8/1993  von Harpe et al. ..................... 423/235

*Primary Examiner*—Wayne Langel
*Assistant Examiner*—Maribel Medina-Sanabria
*Attorney, Agent, or Firm*—Pauley Petersen Kinne & Fejer

[57] ABSTRACT

An improved process for combustion flue gas conditioning in which ammonia is injected into a stream of said combustion flue gas, wherein urea is dissolved in water, forming a dissolved urea solution. The dissolved urea solution is heated and pressurized and the dissolved urea therein hydrolyzed, forming ammonia and carbon dioxide. The ammonia and carbon dioxide are then stripped from the resulting hydrolysis solution and injected into the stream of combustion flue gas to be treated. Water from the stripped hydrolysis solution is then recycled for use in dissolving fresh urea.

8 Claims, 1 Drawing Sheet

PROCESS FOR AMMONIA PRODUCTION THROUGH UREA HYDROLYSIS

BACKGROUND OF THE INVENTION

1. Field of the Invention

This invention relates to a process for treating flue gases and, more specifically, to a process for purifying (conditioning) such flue gases by ammonia addition. More particularly, this invention relates to a process for flue gas treatment by ammonia addition, whereby the ammonia is derived from the hydrolysis of urea.

2. Description of Prior Art

It is well known to add ammonia to flue gases to remove, for instance, nitrogen oxides, which are formed in the course of combustion itself. Reaction between ammonia and nitrogen oxides, in the presence of oxygen, results in nitrogen and water formation in accordance with the following reaction:

$$2NH_3 + NO + O_2 \rightarrow 3H_2O + N_2$$

Ammonia gas is injected into the flue gas stream to be treated by vapor obtained by stripping of the ammonia contained in an ammonia aqueous solution in which the ammonia concentration is roughly 30% by weight. The ammonia aqueous solution has to be transported from the production plant to the user plant, stored, sent to a stripping plant to yield the desired ammonia, and then the ammonia containing residual water has to be neutralized before its disposal.

Ammonia solutions are presently classified as toxic materials. Consequently, certain specific rules have to be followed for its handling, due to the high volatility and pollution level of ammonia.

In order to avoid the aforementioned problems, use of non-toxic, harmless compounds has been proposed which, under the reaction conditions, may yield ammonia. For this purpose, urea has been used to generate ammonia without the formation of any undesired by-product. Use of urea as a conditioning agent of flue gases solves the problem connected with highly toxic material handling and storage; however, to obtain fine particles of solid urea and uniformly inject it into a flue gas stream still presents substantial problems.

SUMMARY OF THE INVENTION

It is one object of the present invention to provide a process for flue gas conditioning by injection of ammonia, in a very simple and viable way, into a stream of said flue gases which avoids problems associated with hazardous material handling and storage.

It is a further object of the present invention to provide a process for in-situ production of gaseous ammonia, wherein said ammonia can be used without being subject to any particular safety rules and without any obligation to maintain, transport and store large volumes of ammonia solutions and toxic noxious material as required by conventional processes.

These and other objects of the present invention are achieved by a process for flue gas conditioning in which urea is dissolved in water to obtain a concentrated urea solution and the dissolved urea is hydrolyzed by heating the concentrated urea solution under pressure, yielding hydrolysis products of ammonia and carbon dioxide. The hydrolysis products are stripped from the solution using hot steam and injected into the flue gas stream while water coming out of the hydrolysis solution is reused to dissolve fresh urea to be fed to the plant.

Urea solution to be hydrolyzed contains in the range of about 10 to 70% urea by weight. The urea hydrolysis is preferably carried out at a temperature in the range of about 100 to 233° C. and a pressure in the range of about $0.1 \times 10^3$ KPa to $3.0 \times 10^3$ KPa.

BRIEF DESCRIPTION OF THE DRAWING

These and other objects and features of this invention will be better understood from the following detailed description taken in conjunction with the drawings wherein.

DESCRIPTION OF PREFERRED EMBODIMENTS

Figure 1:
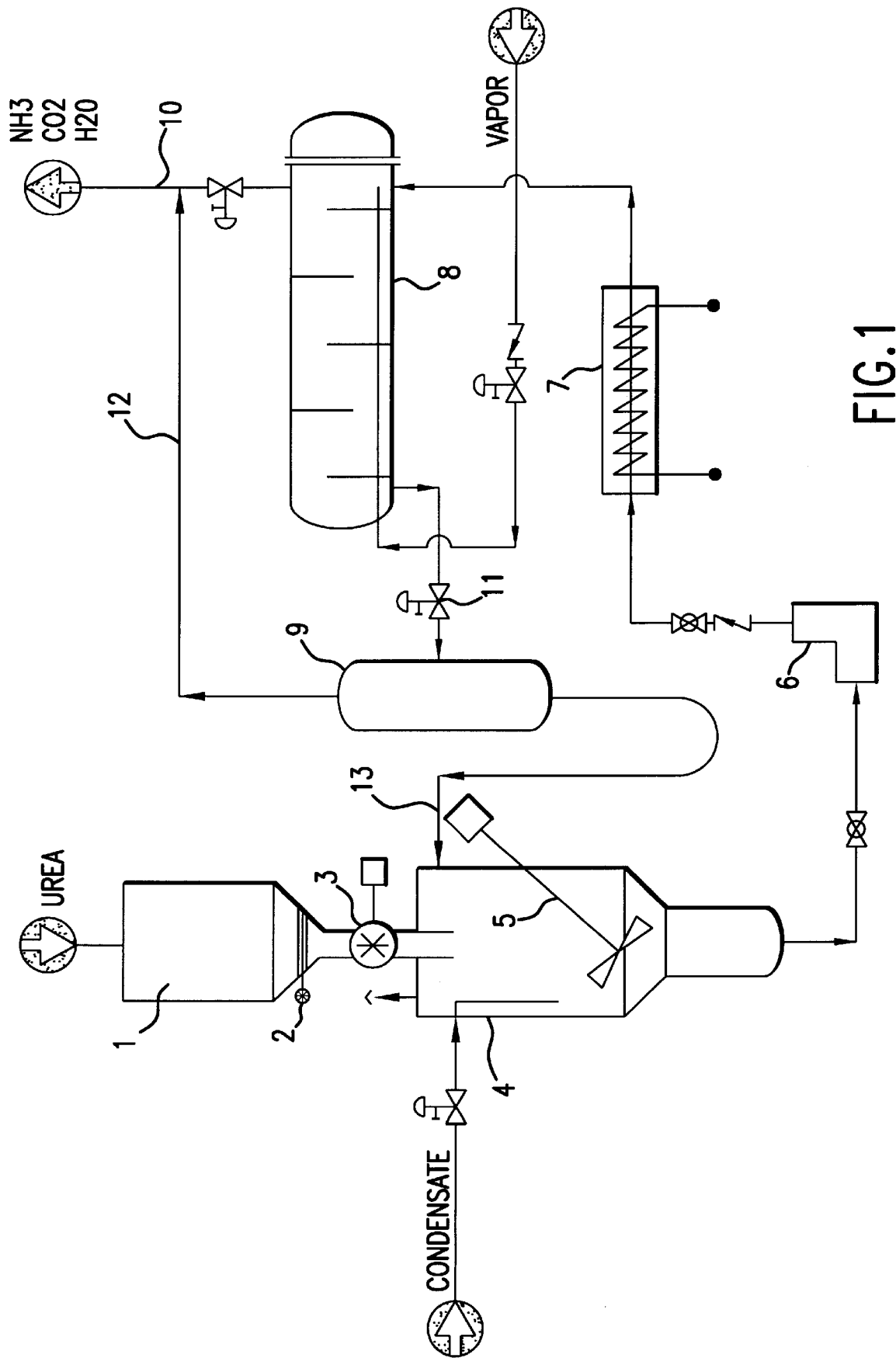
FIG. 1 is a schematic diagram of the process in accordance with one embodiment of this invention.

This invention will now be described in more details with reference to FIG. 1 and the following experimental example. The drawing and example are provided to better illustrate the invention and are not to be construed as limiting of the scope thereof.

As shown in FIG. 1, solid urea, in the form of prills or crystals, is introduced into hopper 1 having a sufficient capacity for at least one day of continuous hydrolyzer operations. Urea, through roll-type feeder 3, is introduced into dissolver 4 where a urea solution of a concentration of about 40% is formed using water condensate from plant battery limits and/or exhausted condensate recycle, which is also introduced into dissolver 4. Urea dissolving operations are facilitated by the action of stirrer 5. Slide valve 2 may be provided at the outlet of hopper 1, if necessary.

The urea/water solution thus obtained is compressed by pump 6 up to hydrolyzer operating pressure and preheated to hydrolysis temperature by means of preheater 7. In accordance with one embodiment of this invention, hydrolyzer operating conditions are as follows:

| Pressure | $1.9 \times 10^3$ KPa |
|---|---|
| Temperature | 195° C. |
| Residence time | 40 minutes |

Under these conditions, about 30–40% by weight urea concentration in the feedstock decreases to about 1–5% in the hydrolyzed solution. Ammonia generated during the hydrolysis process is stripped out from the water solution by means of a defined amount of steam coming from battery limits and injected into the bottom of hydrolyzer 8. Hydrolysis products comprising water-saturated ammonia and carbon dioxide are conveyed to a reaction zone through line 10. Water is expanded through valve 11 and sent to separator 9, operating at atmospheric pressure, and then recycled to dissolver 4. Vapors derived mainly from ammonia and water expansion through line 12 are added to the hydrolysis vapors in order to avoid any environmental pollution. Water from separator 9 is recycled through line 13 to dissolver 4 at a temperature of about 100° C. so that, after having supplied urea with the heat of solution, a solution is obtained at a temperature of about 40° C.

EXAMPLE

To better illustrate the process of this invention, a quantitative example is given hereinafter based on an ammonia capacity of 100 kg/h.

The amount of urea fed to the plant is 177 kg/h and the condensate amount coming from plant battery limits is 87 kg/h. The water recycle amount is 150 kg/h including about 4.5 kg/h of residual urea in the solution. The solution coming out of dissolver 4 is at a temperature of about 40° C. and a urea concentration of about 44% by weight and is sent to pump 6, increasing the pressure up to about $1.6 \times 10^3$ KPa and, through preheater 7, increasing the temperature to about 195° C. The solution enters hydrolyzer 8 resulting in the formation of hydrolysis products having the following characteristics:

| Temperature | 195° C. | | |
|---|---|---|---|
| Pressure | $1.5 \times 10^3$ KPa | | |
| Composition | $NH_3$ | 100 kg/h | 24.12% by weight |
| | $CO_2$ | 129 kg/h | 31.24% by weight |
| | $H_2O$ | 185 kg/h | 44.64% by weight |
| | Total | 414 kg/h | 100.00 |

Direct steam flow to hydrolyzer 8 required to maintain a constant hydrolysis temperature and to strip reaction products is about 155 kg/h.

The result of the process of this invention is that the plant requires only storage facilities for urea, the most used nitrogen fertilizer, which is not subject to any strict regulation and therefore does not require any special handling care. Other major advantages of the present invention are: safety plant operations, absence of any storage by operating personnel of dangerous substances, absence of any polluting material, and investment cost reduction compared with the use of ammonia solutions according to the prior art.

I claim:

1. In a process for combustion flue gas conditioning in which ammonia is injected into a stream of said combustion flue gas, the improvement comprising:

dissolving urea in water, forming a dissolved urea solution;

heating and pressurizing said dissolved urea solution, forming a heated and pressurized dissolved urea solution;

hydrolyzing the dissolved urea in said heated and pressurized dissolved urea solution, forming a hydrolysis solution comprising ammonia and carbon dioxide;

stripping said ammonia and carbon dioxide from said hydrolysis solution by contacting said hydrolysis solution with steam, leaving behind a stripped hydrolysis solution;

injecting said ammonia and carbon dioxide into said stream of said combustion flue gas; and recycling water from said stripped hydrolysis solution for dissolving said urea.

2. A process in accordance with claim 1, wherein said dissolved urea solution comprises about 10% to about 70% by weight urea.

3. A process in accordance with claim 1, wherein said dissolved urea is hydrolyzed at a temperature in a temperature range of about 100° C. to about 233° C.

4. A process in accordance with claim 1, wherein said dissolved urea is hydrolyzed at a pressure in a pressure range of about $0.1 \times 10^3$ KPa to about $3.0 \times 10^3$ KPa.

5. A process in accordance with claim 1, wherein said stripped hydrolysis solution is expanded, forming hydrolysis vapors which are combined with said ammonia and carbon dioxide and injected into said stream of said combustion flue gas.

6. A process in accordance with claim 2, wherein said dissolved urea is hydrolyzed at a temperature in a temperature range of about 100° C. to about 233° C.

7. A process in accordance with claim 6, wherein said dissolved urea is hydrolyzed at a pressure in a pressure range of about $0.1 \times 10^3$ KPa to about $3.0 \times 10^3$ KPa.

8. A process in accordance with claim 7, wherein said stripped hydrolysis solution is expanded, forming hydrolysis vapors which are combined with said ammonia and carbon dioxide and injected into said stream of said combustion flue gas.

* * * * *